Dec. 26, 1967   L. K. STRINGHAM   3,360,197
THERMOSTATIC CONTROL DEVICE
Filed Nov. 23, 1964
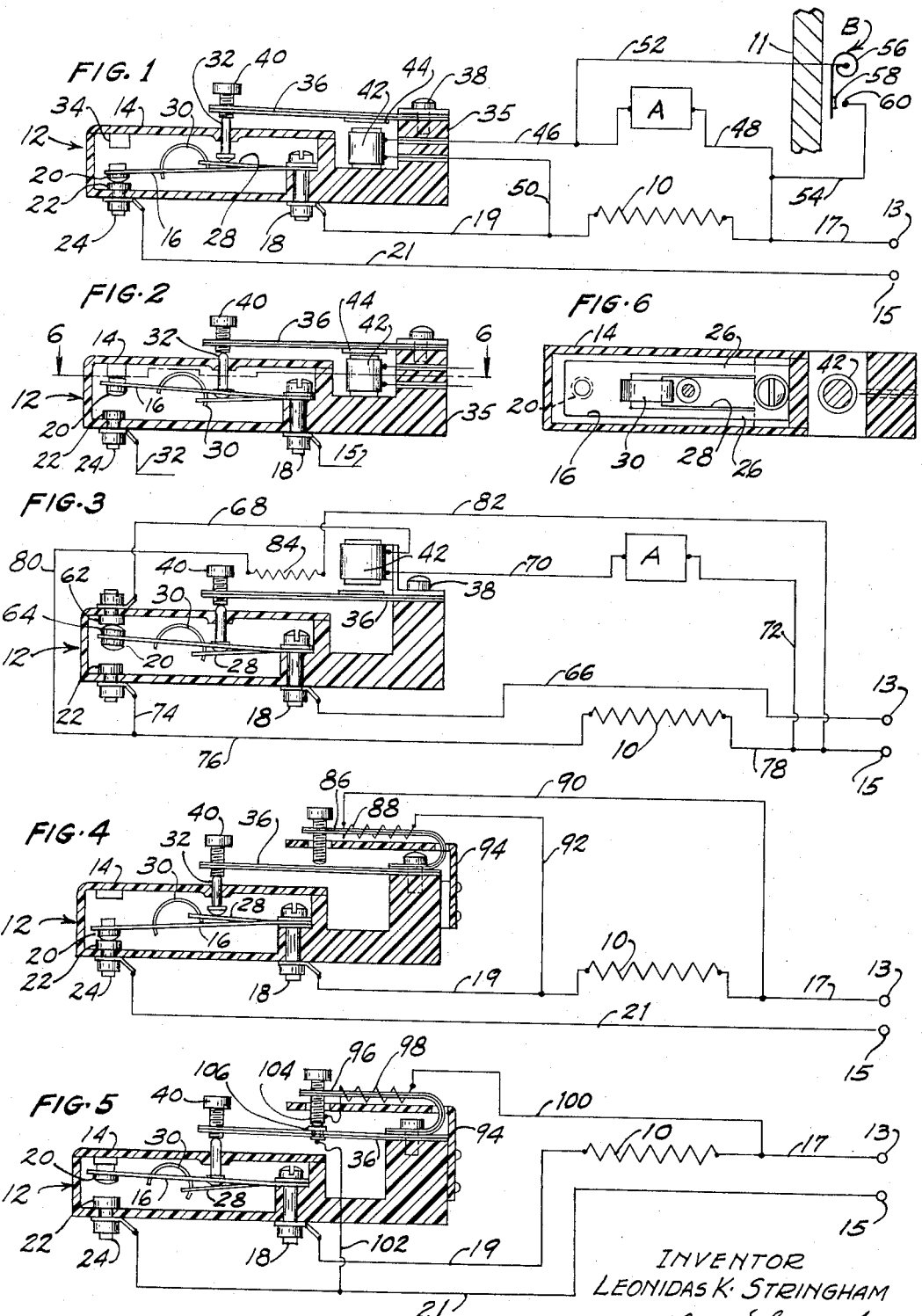
INVENTOR
LEONIDAS K. STRINGHAM
BY Charles E. Markham
HIS AGENT

United States Patent Office 3,360,197
Patented Dec. 26, 1967

3,360,197
THERMOSTATIC CONTROL DEVICE
Leonidas K. Stringham, Clayton, Mo., assignor to Emerson Electric Co., St. Louis, Mo., a corporation of Missouri
Filed Nov. 23, 1964, Ser. No. 413,161
7 Claims. (Cl. 236—68)

This invention relates to temperature control devices in which a thermostatic element operates a control element between open and closed positions in response to temperature change and particularly to means incorporated in a device of this kind operative to minimize the temperature change required to effect its operative response.

When operating a control element such as a switch or valve between "on" and "off" positions by a thermostatic element to effect intermittent operation of heating or cooling means supplying heat to or removing it from a space, some temperature change of the space is required to effect the degree of response of the thermostate required to operate the control element. When the force and movement required to operate the control element is very small and the rate of space temperature change is very low so that the thermostatic element closely follows the space temperature, only a slight change in space temperature is required to effect operation of the control element. Under these conditions a preselected space temperature is closely held.

Frequently, however, considerable closing force of the valve or switch is required, as well as snap-action operation thereof, between its operative positions and, additionally, the rate of space temperature change may be relatively high, at least in one direction. A greater closing force or snap-action operation requires greater force and movement, thereby requiring greater expansion and contraction of the thermostatic element, and, consequently, a greater temperature change in the thermostatic element and in the space temperature to which it is sensitive. As the rate of temperature change of the space is increased the temperature of the thermostatic element will increasingly lag that of the space and consequently a greater change in space temperature will occur before the device is actuated than would be required to operate the device when the rate of space temperature change is low.

Heretofore, means has been employed in heating system thermostats to locally heat the thermostatic element slightly during the time the thermostat is in an "on" position and heat is being supplied to the space so as to raise its temperature and thereby effect operation of the device to an "off" position sooner than would otherwise occur due to the effect of space temperature increase alone. This local heating of the thermostat reduces the space temperature change required to effect its operation from "on" to "off" position whether this temperature change is required to overcome force differential or merely occurs because the temperature of the thermostatic element lags that of the space. The means for locally heating the thermostatic element, called an "anticipator," is usually a low output electrical resistance heater disposed closely adjacent the thermostatic element.

In cooling systems in which the thermostat closes upon a rise in space temperature to start operation of the cooling means, the thermostatic element is usually locally heated slightly by a low output resistance heater during the time the thermostat is in its "off" position and the cooling means is inoperative so that less rise in space temperature is required to effect its operation to an "on" position.

Usually, in heating systems, the thermostat includes means providing snap acting operation of the switch contacts, and the thermostatic element is therefore heated locally at a sufficiently faster rate than the anticipated rate of space temperature increase so as to not only anticipate any lag in the thermostatic element temperature behind space temperature but also to develop in the thermostatic element some or all of the force and movement required to operate the switch to an "off" position. The thermostatic element under these conditions will therefore attain a higher temperature than that of the space at the time the switch is operated to "off" position.

This amount of local heating, of course, substantially reduces the space temperature increase required to operate the switch from "on" to "off" position, and if after heat cutoff the space temperature decreases at a sufficiently slow rate, this local heat which was applied to the thermostatic element will dissipate to ambient and the thermostat will return from its "off" to "on" position in response to a space temperature decrease which is less than would otherwise be required by an amount equal to the temperature change in the thermostatic element resulting from the local heating. If, however, the cool-down rate of the space is higher, all of the local heat will not be dissipated from the thermostatic element by the time the space temperature has decreased this amount and the space temperature will therefore continue to decrease to some lower point at which operation of the thermostat from "off" to "on" position will be effected. The space temperature decrease required to effect return of the device to an "on" position will, therefore under these conditions, be somewhat greater than the difference between the temperature change in the thermostatic element, due to local heating, and that otherwise required without any local heating.

As an example, a space thermostat requiring 4° Fahrenheit change in temperature of the thermostatic element to move its switch between its control positions is set to close its switch contacts and start the supply of heat to a space at 70° Fahrenheit. Assume that the thermostat is closed, that heat is being supplied to the space, and that the temperatures of the thermostatic element and of the space are 70° Fahrenheit. If heat is now locally applied to the thermostatic element at a rate which, together with the heat it is absorbing from the space, will raise the temperature of the thermostatic element 4° Fahrenheit in the time required for the space heating means to raise the space temperature 1° Fahrenheit, the thermostat will open upon a rise in space temperature of 1° Fahrenheit or at 71° Fahrenheit. If, now, the heat supply is cut off and conditions are such that the space temperature decreases at some specific rate which will just permit complete dissipation from the thermostatic element of the locally applied heat and that absorbed from the space in the time required for the space temperature to decrease 1° Fahrenheit back to 70° Fahrenheit, the thermostat will again close at 70° Fahrenheit. Thus, under these conditions, the space temperature will be held within 1° Fahrenheit by a thermostat which normally requires a temperature change of 4° Fahrenheit to effect its operation.

It is well understood, however, that in practice the rate of space temperature change while heat is being supplied thereto, or while the space is subsequently cooling, varies considerably due to ambient or outdoor temperature variations so that the hypothetical thermostat of the preceding paragraph will control the space temperature as described only when the heat loss rate of the space has a specific value. If the heat loss rate of the space increases above this specific value due to lower outdoor temperature, the space temperature will drop 1° Fahrenheit after heat cutoff before the heat absorbed by the thermostatic element has had time to dissipate, and therefore the space temperature will continue to drop below 70° Fahrenheit to some point at which a 4° Fahrenheit temperature drop in the thermostatic element occurs to effect closing of its switch. Thus, as the outdoor temperature drops, causing an increase in the heat loss rate from the space, the space temperature gradually droops below the 70° Fahrenheit adjusted switch closing point.

If, on the other hand, the heat loss rate from the space decreases below the assumed specific value due to higher outdoor temperature, the space temperature will rise 1° Fahrenheit to 71° Fahrenheit, while the heat supply means is operating, in less time than it requires the thermostatic element to absorb sufficient heat from the local heating means and space to increase its temperature the required 4° Fahrenheit to effect opening of the switch. As a consequence, the space temperature will continue to increase beyond the 71° Fahrenheit cut-off point to some higher temperature before the switch opens. Thus, the temperature at which heat cutoff occurs will be raised as the outdoor temperature increases and the heat loss rate decreases.

A factor which in practice appreciably augments the drift of the "on" and "off" temperature control points due to space heat loss rate variations is the inherent storage of heat supplied by the local heating means in support structure adjacent the thermostatic element. When the space heat loss rate is high due to low outdoor temperature, the "on" time of the heat supply means, and therefore the "on" time of the local heating means, is long compared to the "off" time. This results in greater storage of heat in any mass adjacent the thermostatic element which delays dissipation of heat from the thermostatic element as the space is cooling so that the space temperature drifts further below the 70° Fahrenheit control point before the thermostatic element has cooled the required 4° Fahrenheit to close the switch. The opposite, of course, occurs due to heat storage as the space heat loss rate decreases with increasing outdoor temperature, and the "on" time becomes short compared to the "off" time. Under these conditions, the point at which the thermostat switch closes drifts further upward.

The present invention has for an object the provision of means in a thermostatic control device operative to effect a predetermined reduction in the force required to be developed by the thermostatic element to operate the device irrespective of the rate of change of the temperature being controlled.

A further object is to provide means in a thermostatic control device operative to apply a force in a manner and direction to supplement the action of the thermostatic element in its response to a temperature change.

A further object is to provide means in a thermostatic control device operative to apply a force in a manner and direction to supplement the action of the thermostatic element in its response to a temperature change, which means is additionally operative to slightly heat the thermostatic element to anticipate change in the temperature being controlled.

A further object is to provide means in a thermostatic control device operative to apply a force intermittently in a manner and direction to supplement the action of the thermostatic element in its response to a temperature change.

A further object is to provide means in a thermostatic control device operative to apply a force in a manner and direction to supplement the action of the thermostatic element in response to a temperature decrease to move the control element from its heat "off" to heat "on" position and to provide means for locally heating the thermostatic element slightly when in its heat "on" position, thereby to anticipate a rise in the temperature of the space being heated.

A further object is to provide means in a thermostatic control device operative to intermittently apply a force in a manner and direction to supplement the action of the thermostatic element in its response to a temperature change and additionally operative to locally heat the thermostatic element slightly to anticipate change in a space temperature being controlled by the device; and to provide means operative to vary the frequency and length of time that the supplemental force and local heat is applied in accordance with the heat loss rate of the space, the temperature of which is being controlled.

More specifically, it is an object to provide electromagnetic means in a thermostatic control device operative when energized to apply a force which supplements the action of the thermostatic element in operating a two-position control element from its one position to the other, together with means operative to energize the electromagnetic means for short periods when the control element is in its one position.

Another specific object is to provide electrically energized heat motor means in a thermostatic control device operative when energized to apply a force which supplements the action of the thermostatic element in operating a two-position control element from its one position to its other, together with means operative to energize the heat motor means when the control element is in its one position.

Other objects and advantages will appear from the following description when read in connection with the accompanying drawing.

In the drawing.

FIG. 1 schematically illustrates a first form of the invention in which a normally closed, single throw, thermostatically operated, snap action switch controls operation of an electrical resistance space heater and in which electromagnetic means supplements the action of the thermostatic operator as it responds to increasing temperature of the heated space;

FIG. 2 is a view showing the thermostatically operated switch of FIG. 1 is an open position;

FIG. 3 schematically illustrates a second form of the invention in which a thermostatically operated, double throw, snap action switch controls operation of an electrical resistance space heater through its normally closed stationary contact, and in which an electromagnetic actuator controlled through the normally open stationary contact of the switch is operative when energized to supplement the action of the thermostatic element as it responds to decreasing space temperature to permit the switch to return to its normally closed position.

FIG. 4 schematically illustrates a third form of the invention in which a normally closed, single throw, thermostatically operated, snap action switch controls operation of the space heater and in which an electrically energized heat motor applies a force supplemental to the action of the thermostatic operator as it responds to increasing temperature;

FIG. 5 schematically illustrates a fourth form of the invention in which a normally open, single throw, thermostatically operated, snap action switch controls operation of the space heater and in which an electrically energized heat motor acts intermittently to supplement the action of the thermostatic element as it responds to decreasing space temperature; and FIG. 6 is a sectional view of the thermostatically operated, snap action switch taken on line 6—6 of FIG. 2.

Referring to FIG. 1 of the drawing, numeral 10 indicates an electrical resistance heater which supplies heat to a space, the temperature of which is to be controlled. A portion of the enclosure defining the space is indicated at 11. A thermostatically operated switch for controlling operation of the space heater 10 is generally indicated at 12. Switch 12 comprises a casing 14 within which a resilient switch blade 16 is fixed at one end to the casing by a terminal screw 18. Switch blade 16 carries a movable contact 20 at its free end which cooperates with a stationary contact 22 attached to the casing by a terminal screw 24. The space heater 10 is connected across power source terminals 13 and 15 through switch 12 by leads 17, 19, and 21.

The switch blade 16 is formed from thin, resilient, electrically conductive sheet stock and is so formed that its free end normally biases movable contact 20 downward against contact 22. Referring to FIG. 6, a portion of resilient switch blade 16 extending outward from its fixed end is bifurcated, and extending outwardly from its fixed end and between the legs 26 of its bifurcated portion is an operating strip portion 28. The length of the operating strip portion 28 is somewhat less than the length of the bifurcated portion, and a bowed leaf spring 30 is biased between the free end of the operating strip portion and the main blade at the outer end of its bifurcated portion. The operating strip portion 28 is formed so that in its free position it extends outwardly and upwardly from the fixed end of the switch blade at an angle to the main blade portion 16, as shown in FIG. 1.

An operating pin 32 slidably guided in an aperture in the top of casing 14 bears at its lower end on operating strip portion 28. A downward pressure on the pin 32 moves operating strip portion 28 toward a position of alignment with the main portion of blade 16. As this occurs the bowed spring 30 is stressed, thereby storing energy which, when the operating strip portion 28 reaches a critical point of alignment with the main portion of spring blade 16, is released, causing the outer end of blade 16 to snap upward to an open switch position and the operating portion 28 to snap downward, as shown in FIG. 2. The ends of the bowed spring 30 are entered into slots in the main and operating strip portions of the switch blade so that the ends of the bowed spring 30 are free to rotate. When the downward pressure is removed from operating pin 32, the upward bias of the operating strip portion 28 and the downward bias of blade 16 return the switch to its closed position, as shown in FIG. 1, with a snap action. A stop member 34 attached to the upper portion of the casing limits the upward movement of the free end of switch blade 16.

Mounted on an extending support portion 35 of the casing 14 is a strip of bimetal 36 having one end attached to support portion 35 by a screw 38 and having its free end overlying the switch operating pin 32. The bimetal strip 36 is constructed so that its free end warps downward in response to an increase in the space temperature being heated by heater 10. An adjusting screw 40 threadedly engaged in the free end of bimetal strip 36 engages the upper end of switch operating pin 32. Underlying bimetal strip 36 at an intermediate point therealong, and attached to the casing, is an electromagnet 42 which, when energized, attracts an armature 44 attached to bimetal strip 36 and thereby applies a downward force on the bimetal strip. Thus, if the electromagnet is energized when the bimetal strip is tending to warp downward due to space temperature increase, the downward force applied thereby will be supplemental to the action of the bimetal strip as it responds to space temperature increase.

The winding of electromagnet 42 is connected across the space heater 10 by leads 46, 48, and 50 and its operation is therefore primarily controlled by switch contacts 20–22. Interposed in this connection between leads 46 and 48 is a control means, designated "A," which may be of any suitable construction, which will effect intermittent energization of the electromagnet 42 at a predetermined frequency and for a predetermined time interval provided, of course, that switch contacts 20–22 are closed. A second control means, designated "B," connected across the control means A by leads 52 and 54, functions to increase the total time during which electromagnet 42 is energized as the outdoor temperature increases. The control means B is shown schematically as a bimetal element 56 carrying a movable contact 58 which cooperates with a stationary contact 60. The bimetal element 56 is constructed so as to close contacts 58–60 in response to an increase in outdoor temperature. When contacts 58–60 are closed the electromagnet 42 is constantly energized, provided, of course, that contacts 20–22 are closed.

OPERATION OF FIG. 1

The switch contacts 20–22 are in a closed position in FIG. 1 and contacts 58–60 of control means B are open. Under these conditions space heater 10 is energized, the space is being heated, the bimetal element 36 is absorbing heat from the space, and the electromagnet 42 is being energized at some predetermined frequency and for some predetermined time interval by control means A. When the downward acting force developed in bimetal strip 36 due to temperature increase, plus the downward force applied by the electromagnet 42, equals the downward force required to operate the switch, the switch will be operated to its open position, as shown in FIG. 2, upon the first succeeding instance of energization of the electromagnet. When switch contacts 20–22 open, the electromagnet 42 and space heater 10 are de-energized.

Inasmuch as the switch 12 is of the self-returning type which normally returns to a closed position, it will be apparent that some downward force is required to hold the switch blade 16 in its open contact position, and in view of the fact that the electromagnet 42 is now de-energized, this holding force must be applied by the bimetal strip 36. In a normally closed, self-returning, snap action switch of the type illustrated, the force required to hold the switch open is somewhat less than that required to open it. In moving the switch to an open position sufficient force must be applied to overcome the bias of the resilient operating strip portion 28 and compress the bowed spring 30. In returning, the bias of the strip portion 28 acts to compress the bowed spring 30 so that the required holding force is less than the required opening force by approximately the force required to compress the bowed spring 30. In commercially available precision switches of this type, rated at 20 to 25 amperes, the force required to hold the switch open is in the order of two-thirds the force required to open the switch.

In order to more clearly illustrate the operation and advantages of the present invention, let it be assumed that the switch of FIG. 1 requires the application of twelve ounces of downward force to operate it to the open position of FIG. 2 and one third less or eight ounces to hold it in this open position. Assume further that 1° Fahrenheit change in temperature of the thermostatic element 36 varies the downward pressure it exerts at its free end by one ounce and that adjustment screw 40 is adjusted so that the bimetal element exerts a downward pressure of twelve ounces when its temperature is 74° Fahrenheit, so that the switch is moved from closed to open position at 74°. Inasmuch as it requires eight ounces or four ounces less than twelve ounces to hold the switch open, the switch will again close when the temperature of the bimetal element drops 4° Fahrenheit to 70° Fahrenheit. If the rates at which the space is heated when the switch is closed and at which it cools when the switch is open are such that the temperature of the bimetatl element can closely follow the space temperature change, the space temperature will be controlled without operation of the electromagnet 42 within 4° Fahrenheit from 70° Fahrenheit to 74° Fahrenheit. If, however, under these conditions, the electromagnet 42 is energized when the switch is closed and applies a downward force equivalent to three ounces at the adjustment screw 40, the switch will be opened at 71° Fahrenheit instead of at 74° Fahrenheit, and as the temperature of the bimetal strip drops to 70° Fahrenheit, the switch will again close, the downward force being applied by the electromagnet being removed, of course, when the switch snaps open. The result of the application of this force by the electromagnet will, therefore, enable the thermostatic element to control the space temperature to within 1° Fahrenheit from 70° Fahrenheit to 71° Fahrenheit under conditions in which the temperature of the thermostatic element closely follows the space temperature in both directions.

It will be noted that this means of reducing the temperature change of the thermostatic element is not affected by variations in the rate of change of the space temperature while increasing or decreasing, or by variations in the ratio of "off" time to "on" time of the space heater, provided that no appreciable amount of heat generated in the winding of the electromagnet 42 is absorbed by the bimetal element 36 or by the adjacent structure. Under conditions in which the rate of change of space temperature is very low so that the temperature of the thermostatic element follows closely, no heating of the bimetal element to anticipate space temperature change is required or desirable, and that portion of the work required to operate the control which will reduce the temperature differential the desired amount is performed by the electromagnet 42. To avoid any incidental local heating of the thermostatic element by the electromagnetic winding, the control means A may be arranged to energize the electromagnet at 10 or 15 second intervals for a period of less than a second. Under these conditions, the control means B is adjusted so that it will not close.

On the other hand, under conditions in which the rate of space temperature change is relatively high so that the temperature of the thermostatic element lags and results in an undesirable widening of the space temperature range, some degree of local heating of the bimetal element 36 by the winding of the electromagnet 42 is desirable to anticipate the space temperature change, even though the greater portion of the switch opening force is supplied by the electromagnet. This is accomplished by the arrangement shown in FIG. 1, while at the same time minimizing the "droop" effect incidental to the conventional use of anticipating heaters.

When it is desired to locally heat the bimetal element 36, control means B is adjusted so that contacts 58–60 are open when the outdoor temperature is below some predetermined intermediate point in the outdoor temperature range requiring operation of the space heater and closed when the outdoor temperature rises above this point. When switch contacts 58–60 are open due to low outdoor temperature, the electromagnet 42 is energized intermittently by control means A at a frequency, and for such intervals of time, which will effect a relatively slight, predetermined heating of bimetal element 36 by the winding of electromagnet 42 during the relatively long "on" time and short "off" time operation period of the space heater. Under conditions of low outdoor temperatures and relatively high heat loss rate from the space, the rate of increase in space temperature is relatively low and the rate of decrease relatively high so that a relatively small amount of local heating of the bimetal element is required to anticipate space temperature increase. When switch contacts 58–60 are closed due to higher outdoor temperatures, the electromagnet 42 is energized constantly during operation of the space heater 10. Under conditions of higher outdoor temperatures, the rate of space temperature increase due to heating is relatively high, requiring more local heating and anticipation, and the rate of decrease in space temperature is relatively low, permitting more time for dissipation of the local heating.

In FIG. 3, in which like numerals refer to like elements, the thermostatically operated switch 12 is provided with an upper stationary contact 62 and a cooperating movable contact 64. The switch 12, when in its free position, is normally closed with respect to its contacts 20–22, as in FIG. 1, but is shown in FIG. 3 held in its opposite throw position with contacts 62–64 closed by thermostatic element 36 which is constructed so as to warp downward with increasing temperature as in FIG. 1. In this arrangement electromagnet 42 exerts an upward pull on bimetal 36 when energized, and its energizing circuit extends from power source terminal 13 through a lead 66 to terminal 18, through switch blade 16, contacts 62–64, a lead 68, a lead 70, control means A, and leads 72 and 78 to power source terminal 15.

The energizing circuit for heater 10 in this arrangement extends from power source terminal 13 through lead 66 to terminal 18, through switch blade 16, contacts 20–22 when closed, a lead 74, and leads 76 and 78 to power source terminal 15. Connected across space heater 10 by leads 80 and 82 is a low output electrical resistance heater 84 which is arranged to locally heat the bimetal element 36 and is energized concurrently with the space heater 10.

OPERATION OF FIG. 3

The switch 12, in the arrangement shown in FIG. 3, is in an open position with respect to contacts 20–22 and closed with respect to contacts 62–64 so that space heater 10 and anticipating heater 84 are de-energized and electromagnet 42 is under control of control means A. The switch is held in this position by the bimetal strip 36. Under these conditions the space and bimetal strip 36 are cooling and the electromagnet 42 is being energized intermittently at a predetermined frequency and for a predetermined interval by control means A. When the bimetal strip 36 has cooled to the point wherein its resistance to upward movement is less than the sum of the return force of the switch and the upward force applied by electromagnet 42, the switch will return to its normally closed position, effecting energization of the space heater 10 and anticipating heater 84 and de-energizing the electromagnet 42. When the temperature of the bimetal element 36 now increases sufficiently due to increasing space temperature and local heating by the heater 84, its downward force will be increased to the point wherein it actuates the switch to the position shown.

In this arrangement the electromagnet 42 acts to supplement the action of the bimetal element as it is responding to decreasing temperatures, thereby reducing the temperature change required therein to effect actuation of the switch to its normally closed position. When the switch 12 is in a heat "on" position with contacts 20–22 closed and the local heating element 84 is operating to slightly heat the bimetal element to anticipate space temperature increase, the electromagnet 42 will be inoperative.

It will also be noted that in this arrangement the application of heat to bimetal strip 36 by the local heater 84 is constant during the heat "on" position of the switch and that a downward drift or droop of the control point is inherent as the heat loss rate of the space increases. To overcome this undesirable effect, the electromagnet 42 is intermittently operated during the heat "off" position of the switch 12 in such manner that the heat generated in its winding will compensate this undesirable effect resulting from constant rate heating of the bimetal by heater 84. Inasmuch as the retention or storage of heat supplied by local heater 84 tends to increase as the "on" time of the space heater increases with respect to its "off" time, and the storage of heat incidentally supplied by the electromagnet 42 increases as the "off" time of the space heater increases with respect to the "on" time, the drift of the control point is compensated when the required total operation time of the electromagnet during the heat "off" period is determined and effected by control means A.

In the arrangement shown in FIG. 4, the switch 12 is in its normally closed heat "on" position with contacts 20–22 closed. A heat motor comprising a bimetal strip 86 and a resistance heater 88 for heating it applies a downward force supplemental to the action of bimetal strip 36 as it responds to increasing temperature to operate switch 12 to an open position. The resistance heater 88 is connected across the space heater 10 by leads 90 and 92 so that it is energized concurrently with the space heater. The bimetal strip 86 warps downward at its free end when heated. To avoid inadvertent heating of the bimetal strip 36 by heat motor heater 88, heat insulation means 94 is provided. As shown in FIG. 4, some predetermined local heating of the bimetal strip 36 will occur by conduction. However, if conditions are such that it is desirable to eliminate any local heating of the bimetal strip 36, the bimetal strip 86 and its heater 88 may readily be completely isolated from bimetal strip 36.

In the arrangement shown in FIG. 5, the normally closed switch 12 is shown held in an open position jointly by bimetal strip 36 and a bimetal strip 96 of a heat motor comprising the bimetal strip 96 and a resistance heater 98. The bimetal strip 96 is arranged to warp upward at its free end when heated, thereby subtracting from the total force holding switch 12 open and therefore supplementing the action of the bimetal strip 36 as it responds to decreasing temperature. The heater 98 is connected across the electrical resistance space heater 10 and switch contacts 20–22 by leads 100 and 102. The heater 98 is intermittently energized at a predetermined frequency and for a predetermined interval through switch contacts 104 and 106 during the period that main switch contacts 20–22 are open and space heater 10 is de-energized. When switch contacts 20–22 are closed and space heater 10 is energized, heater 98, being connected in parallel, is of such relative resistance as to be operatively shunted.

In operation of FIG. 5, the bimetal strip 96, when cool, exerts a predetermined downward pressure upon the bimetal strip 36 which supplements the downward force applied by bimetal strip 36 to effect opening of contacts 20–22 as strip 36 responds to an increase in space temperature. When contacts 20–22 have been opened, heater 98 becomes operative to heat bimetal strip 96 which warps upward to remove the downward pressure on strip 36 and effect opening of its contacts 104–106. Upon opening of contacts 104–106 strip 96 again cools and recloses these contacts and, thereafter, continues to intermittently apply and remove the predetermined downward pressure on bimetal strip 36 as long as main switch contacts 20–22 are open. As the bimetal strip 36 now cools slightly due to decreasing space temperature, the main switch contacts 20–22 will again close upon the next instance in which the downward pressure by strip 96 is relieved.

In this arrangement some slight local heating of bimetal strip 36 occurs during the cool-down period when space heater 10 is de-energized due to operation of heater 98. Under conditions of heavy current switching wherein the voltage drop across contacts 20–22 causes unavoidable local heating of the switch structure and bimetal strip 36 during the heat "on" period, this slight local heating of bimetal strip 36 due to intermittent operation of heater 98 during the heat "off" period acts to compensate drift of the adjusted control point.

It is to be understood that in any of the foregoing arrangements the force applied jointly with that of the thermostatic element in effecting operation of a control element from one position to another may be any portion of the total force required, and that when such force is applied as by an intermittently energized electromagnet, the action is one of impact when any lost motion is involved, or when this force is absorbed in resilient members such as the bimetal strip 36 and the switch blade 16, it is inherently a perturbation. When a supplemental force is applied in this manner to a snap-acting control any undesirable softness or creeping of the snap-acting means is precluded and its action is sharp.

It is to be further understood that under conditions of use wherein premature momentary movement of the control element from one position to another is not objectionable, these force pulses or perturbations may be of greater magnitude than is normally required to effect operation of the control means, thereby to open switches or valves which tend to stick in a closed position.

The foregoing description and drawing are intended to be illustrative and not limiting, the scope of the invention being set forth in the appended claims.

I claim:

1. In a thermostatic control device for controlling the temperature of a space being heated, a normally closed snap-acting switch, a thermostatic element operative to actuate said switch to an open position in response to an increase in the temperature of the space being heated, an electromagnet having a winding and which when energized applies a force acting to move said switch toward its open position and said electromagnet winding being operative when energized to slightly heat said thermostatic element, an energizing circuit for said electromagnet including said snap-acting switch, a time switch in said circuit operative when said snap-acting switch is closed to alternately complete and break said energizing circuit at a predetermined frequency and for predetermined periods, circuit connections forming a shunt across said time switch, and a temperature responsive switch in said shunt responsive to the temperature ambient to the space being heated and operative to complete said shunt when the ambient temperature is above a predetermined point and to break said shunt when the ambient temperature falls below said predetermined point, whereby said electromagnet is operated constantly during the time said snap-acting switch is closed and the ambient temperature is relatively high and is operated intermittently when the ambient temperature is relatively low.

2. In a thermostatic control device, a double-throw switch having first and second control positions, means providing snap acting operation of said switch between said positions, a thermostatic element operatively connected to said switch and operative to move said switch from its first control position to its second control position in response to an increase in temperature, electrically operated means operatively connected to and operative when energized to apply a force to said thermostatic element acting in a direction to move said switch from its second control position toward its first control position, circuit means completed through said switch when in its second position for energizing said electrically operated means, an electrical resistance heater operative when energized to slightly heat said thermostatic element, and circuit means completed through said switch when in its first position for energizing said resistance heater.

3. A thermostatic control device as set forth in claim 2 in which said electrically operated means includes electrical resistance means operative to slightly heat said thermostatic element when said switch is in its second position and said electrically operated means is energized, thereby to compensate for the retention of any heat supplied by said electrical resistance heater when said switch is in said first position.

4. A thermostatic control device as set forth in claim 2, which further includes means biasing said switch in its first control position.

5. In a thermostatic control device, a snap-acting switch biased to return to one control position, support means, a bimetal element having one portion thereof supported on said support means and another portion spaced therefrom operatively connected to said switch and said element being operative in response to a temperature change in one direction to warp intermediately of said portions in a direction to actuate said switch from its one control position to another, electromagnetic means operative when energized to apply a force to said bimetal element at a point intermediate of its supported portion and its portion operatively connected to said switch acting in a direction to move said switch from its one control position toward another, a circuit for energizing said electromagnetic means under the control of said switch and completed at that point when said switch is in its one position, and said circuit including control means operative to alternately complete and interrupt energization of said electromagnetic means at a predetermined frequency and for predetermined periods.

6. In a thermostatic control device, a switch movable between two control positions, means effecting a snap action operation of said switch between its control positions, and said snap action means presenting significant resistance to the movement of said switch from one of its positions to the other, a thermostatic element operatively connected to said switch and operative to move said switch from its said one position to its other position in response to temperature change, an electromagnet operatively connected to said thermostatic element and operative when energized to apply a force to said thermostatic element acting in a direction to move said switch from its one control position toward the other and being energized when said switch is moved to its one position, the force applied by said electromagnet being limited to that which overcomes the resistance of said snap action means to the movement of said switch from its one control position to the other, and an energizing circuit for said electromagnet under the control of said switch and completed at that point when said switch is in said one control position and rendered incomplete when said switch is moved from said one control position.

7. A thermostatic control device as set forth in claim 6 in which said energizing circuit under the control of said switch further includes means operative when said energizing circuit is completed to alternately make and break said circuit at predetermined frequencies.

References Cited

UNITED STATES PATENTS

| | | | |
|---|---|---|---|
| 1,170,727 | 2/1916 | Baker | 236—69 |
| 1,583,496 | 5/1926 | Shafer | 236—68 |
| 1,925,836 | 9/1933 | Johnsson. | |
| 1,983,077 | 12/1934 | Getchell | 200—122 |
| 2,249,844 | 7/1941 | Martin | 236—68 |
| 2,285,913 | 6/1942 | Derrah | 236—68 |
| 2,548,983 | 4/1951 | Klug | 236—68 |

FOREIGN PATENTS 711,150  6/1931  France.

MEYER PERLIN, *Primary Examiner.*

ALDEN D. STEWART, ROBERT A. O'LEARY,
*Examiners.*

W. E. WAYNER, *Assistant Examiner.*